United States Patent
Hiraguchi

(10) Patent No.: US 6,892,974 B2
(45) Date of Patent: May 17, 2005

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 70 days.

(21) Appl. No.: 10/352,988

(22) Filed: Jan. 29, 2003

(65) Prior Publication Data

US 2003/0146329 A1 Aug. 7, 2003

(30) Foreign Application Priority Data

Feb. 1, 2002 (JP) ........................................ 2002-025627

(51) Int. Cl.$^7$ ............................................ G11B 23/107
(52) U.S. Cl. ................ 242/347.1; 242/348; 242/348.1; 242/348.2; 242/348.3; 242/348.4
(58) Field of Search ............................. 242/347.1, 348, 242/348.1, 348.2, 348.3, 348.4

(56) References Cited

U.S. PATENT DOCUMENTS

| | | | |
|---|---|---|---|
| 6,349,892 B2 * | 2/2002 | Morita et al. ............ 242/347.1 |
| 6,672,528 B2 * | 1/2004 | Morita et al. ............... 242/348 |
| 2003/0071157 A1 * | 4/2003 | Hiraguchi et al. ....... 242/348.2 |
| 2003/0080228 A1 * | 5/2003 | Hiraguchi et al. ....... 242/348.2 |
| 2003/0222167 A1 * | 12/2003 | Hiraguchi ................... 242/348 |
| 2003/0234309 A1 * | 12/2003 | Hiraguchi ................ 242/348.2 |
| 2004/0004147 A1 * | 1/2004 | Ishihara ................... 242/348.2 |
| 2004/0046076 A1 * | 3/2004 | Hiraguchi ................... 242/338 |

* cited by examiner

Primary Examiner—Kathy Matecki
Assistant Examiner—Sang Kim
(74) Attorney, Agent, or Firm—Sughrue Mion, PLLC

(57) ABSTRACT

A recording tape cartridge disclosed with an increased strength leads to a compact drive device. A rectangular case of the recording tape cartridge accommodates a single reel on which a recording tape is wound. An opening for pulling out a leader member attached to an end of the recording tape is formed in a corner disposed closest to the drive device among corners of the case at the time of insertion into the drive device. The recording tape cartridge includes a shield slidable to open and close the opening, a guide wall for guiding the shield, and a friction-reducing device protruding from the shield. The guide wall is provided along an inner surface of the case. The friction-reducing device abuts the guide surface of the guide wall in order to reduce friction between the shield and the guide surface.

38 Claims, 14 Drawing Sheets

RECORDING TAPE CARTRIDGE

BACKGROUND OF THE INVENTION

1. Field of the Invention

The present invention relates to a recording tape cartridge. The recording tape cartridge accommodates a single reel around which a recording tape, such as a magnetic tape, primarily used as a recording/playback medium for a computer or the like.

2. Description of the Related Art

Conventionally, there is known a magnetic tape cartridge constructed such that a magnetic tape used as a data recording/playback medium for a computer or the like is wound on a single reel, and the reel is accommodated in an accommodating case. A leader member, such as a leader pin, a leader tape, or a leader block, is provided to the end of the magnetic tape. The leader member is pulled out from an opening of the magnetic tape cartridge by using pull-out means provided in a drive device, and the magnetic tape fixed to the leader member is wound around a take-up reel in the drive device.

A reel gear is formed annular in the center of the reel lower surface appearing from an opening formed on a lower surface of the magnetic tape cartridge, a drive gear provided on a rotation shaft in the drive device is engaged with the reel gear, and the reel is thereby rotationally driven. Therefore, data can be recorded on the magnetic tape, or data recorded on the magnetic tape can be played back in such a manner that the reel of the magnetic tape cartridge and the take-up reel of the drive device are rotated in synchronization.

Magnetic tape cartridges of the above-described type are characterized in that the accommodating space for preservation can be small, and a large amount of information can be recorded. In addition, as shown in FIGS. 12 to 14, the position of the opening and the type of a door for opening and closing an opening are different depending on the type of the leader member. More specifically, as shown in FIG. 12, with a leader pin 110, an opening 118 is formed on a sidewall 114 of an accommodating case 112 formed parallel to the direction of insertion to the drive device (direction of an arrow P). In this case, a door 116 slidably moves in the same direction as the direction of insertion to thereby open and close the opening 118.

However, in the construction including the opening 118 provided on the sidewall 114 of the accommodating case 112, pull-out means of the drive device needs to pull out the leader pin 110 from a left-right lateral direction of the accommodating case 112 via a roundabout route. Therefore, a space for allowing the pull-out means to perform the roundabout access needs to be secured on the side of the drive device, and a complicated mechanism is necessary for driving the pull-out means to perform the roundabout access. This arises a problem in that the drive device needs to be enlarged. Another problem is that the length of the path for pulling out the magnetic tape 108 needs to be increased. Still another problem is that since the door 116 is slidably moved in a state where an upper end portion and a lower end portion thereof are inserted between guide grooves 117, the accommodating-case strengths for the portions of the guide grooves 117 are reduced.

With a leader tape 120, as shown in FIG. 13, an opening 128 is formed on a front wall 124 of an accommodating case 122 formed perpendicular to the direction of insertion to the drive device (direction of an arrow P). In this case, a door 126 is formed to be of a pivot type that pivots in a front direction around the center of a spindle supported in the vicinity of a corner portion of the accommodating case 122. However, in the construction including the opening 128 on the front wall 124 of the accommodating case 122 although the pull-out means of the drive device need not perform the roundabout access, the door 126 largely open in the front direction. Therefore, a space needs to be secured on the side of the drive device in order not to allow any obstruction against the door 126 when the opening 128 is opened. This leads to a problem in that the drive device needs to be enlarged.

With a leader tape 130, as shown in FIG. 14, an opening 138 is formed by diagonally cutting off a corner portion 134 on a front side in the direction of insertion to the drive device. In this case, the opening 138 is directly opened and closed by a leader block 130. However, in the construction thus using the leader block 130 to open and close the opening 138, a problem arises in that the leader block 130 tends to be damaged and stained. Specifically, the leader block 130 is fitted into a reel hub 136 in the drive device, thereby constituting a portion of the reel hub 136. Therefore, even with a damaged portion, a stained portion, or the like that does not cause any problems as long as the leader block 130 is used as a normal door, a case can occur in which, for example, the fitting into the reel hub 136 is caused to be difficult, or a problem is caused in the running of a magnetic tape 108.

Further, since the leader block 130 is just engaged with an end portion of the opening 138, a problem can occur in which the leader block 130 is easily disengaged therefrom in such an event the magnetic tape cartridge is dropped. Still another problem is that since the leader block 130 is large in comparison to the leader pin 110, restrictions regarding the shape of the storage case are increased. Therefore, the leader pin 110 functionally independent of the door is more preferential than the leader block 130 functioning concurrently as the door.

SUMMARY OF THE INVENTION

Accordingly, an object of the present invention is to obtain a recording tape cartridge of the type using a door for opening and closing an opening and a leader member for pulling out a recording tape, which are provided as mutually independent members. The recording tape cartridge includes an opening with which a pull-out path for a recording tape is reduced shortest and a slidable door capable of opening or closing the opening in a small space, whereby a drive device can be miniaturized, and concurrently, the strength thereof can be increased.

To achieve the above-described object, a first aspect of the invention provides a recording tape cartridge comprising a rectangular accommodating case, an opening for pulling out a leader member, a shielding member slidably moving to open and close the opening, a guide wall portion for guiding the shielding member, a friction-reducing device for reducing friction between the shielding member and the guide surface. The rectangular accommodating case rotatably accommodates a single reel on which a recording tape is wound. The opening is formed by cutting off a corner portion on the side of insertion of the accommodating case into a drive device. The leader member is attached to an end portion of the recording tape. The guide wall portion is provided along an inner surface of the accommodating case. The friction-reducing device is provided to protrude from the shielding member and is abuttable with the guide surface of the guide wall portion.

A second aspect of the invention provides a recording tape cartridge, comprising an accommodating case, an opening, a shielding member, and a guide wall portion that are common to those of the first aspect. A portion of the shielding member other than an opening-blocking portion thereof is formed lower in height than the opening-blocking portion.

A third aspect of the invention provides a recording tape cartridge comprising an accommodating case, an opening, a shielding member, and a guide wall portion and a friction-reducing device that are common to those of the first aspect. A portion of the shielding member other than an opening-blocking portion thereof including the friction-reducing device is formed lower in height than the opening-blocking portion including the friction-reducing device.

According to the invention, the opening is provided by cutting off the corner portion on the side of insertion of the accommodating case into the drive device. Thereby, since an opening face of opening faces the direction of insertion of the accommodating case into the drive device, pull-out means on the side of the drive device can moves into the accommodating case from a front side thereof. Thereby, a path for pulling out the recording tape can be reduced shortest. Therefore, this obviates the needs of providing the drive device with a complicated mechanism causing the recording tape to run along a roundabout path, thereby enabling the design of a drive device that is compact and that can be manufactured at low costs. In addition, since the recording tape runs along the shortest path, also the wear of the recording tape due to contact with a tape guide can be reduced. Further, the shielding member slidably moves by being guided by the guide wall portion provided parallel to the inner surface of the accommodating case. Therefore, a groove or the like as provided in the conventional case need not be provided, thereby enabling a sufficient strength of the accommodating case to be secured.

In specific, according to the first and third aspects of the invention, the friction-reducing device that abuts the guide surface of the guide wall portion and that reduces friction between the shielding member and the guide surface is provided to protrude in the shielding member. Thereby, the shielding member can be suitably slid to open and close the opening.

According to the second aspect of the invention, the portion of the shielding member other than the opening-blocking portion thereof is formed lower in height than the opening-blocking portion. Thereby, the contact area between the shielding member and the guide wall portion can be reduced. Consequently, sliding resistance (friction) therebetween can be reduced.

According to the third aspect of the invention, the portion of the shielding member other than the opening-blocking portion thereof including the friction-reducing device is formed lower in height than the opening-blocking portion including the friction-reducing device. Thereby, the contact area between the friction-reducing device and the guide wall portion can be reduced. Consequently, sliding resistance (friction) therebetween can even more be reduced.

DETAILED DESCRIPTION OF THE EMBODIMENTS

Figure 1:
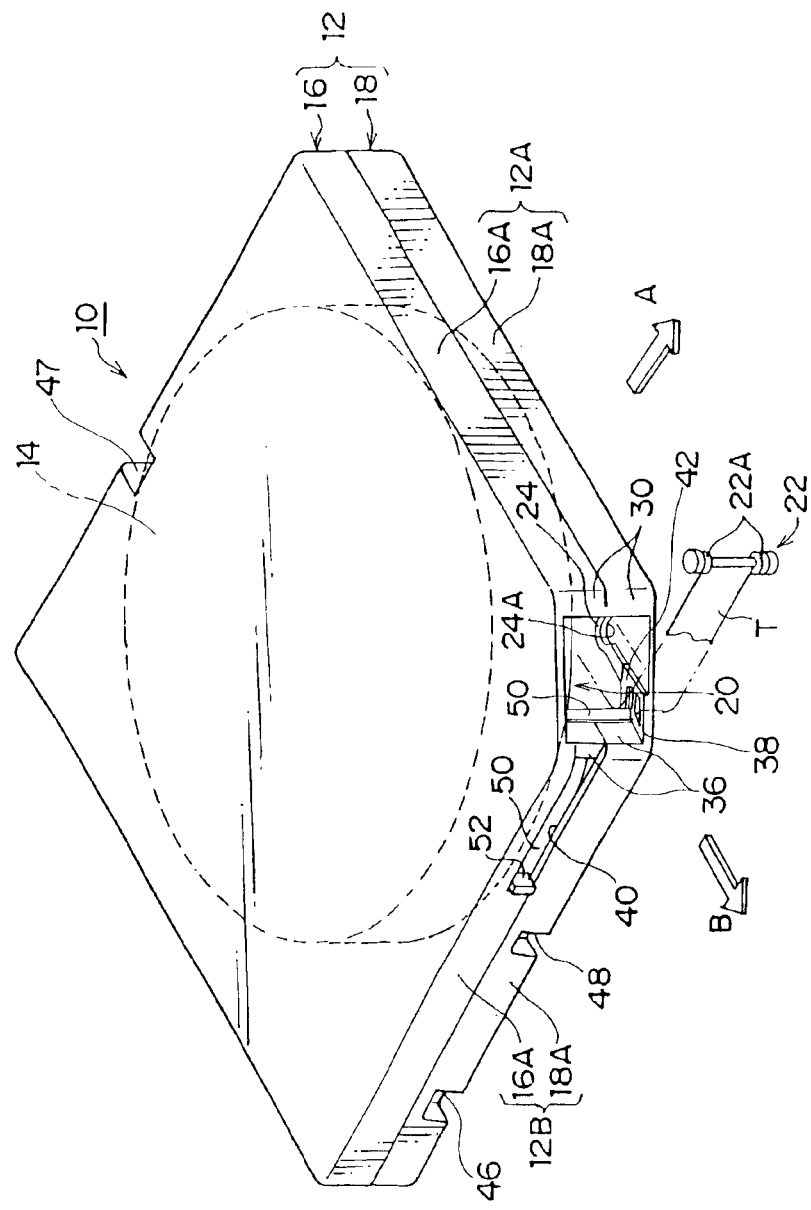
FIG. 1 is a schematic perspective view of a recording tape cartridge.

Hereinbelow, a recording tape cartridge 10 according to an embodiment of the present invention will be described with reference to FIGS. 1 to 11. First, the overall construction of the recording tape cartridge 10 will briefly be described. Then, essential portions relative to the invention will be described. In the drawings, for the sake of description, the direction of insertion of the recording tape cartridge 10 into a drive device is shown by an arrow A (refer to FIG. 1). The insertion direction is assumed as the front direction (foreside) of the recording tape cartridge 10. On the other hand, the direction shown by an arrow B perpendicular to the arrow A is assumed as the right direction of the recording tape cartridge 10.

Overall Construction of the Recording Tape Cartridge

Figure 2:
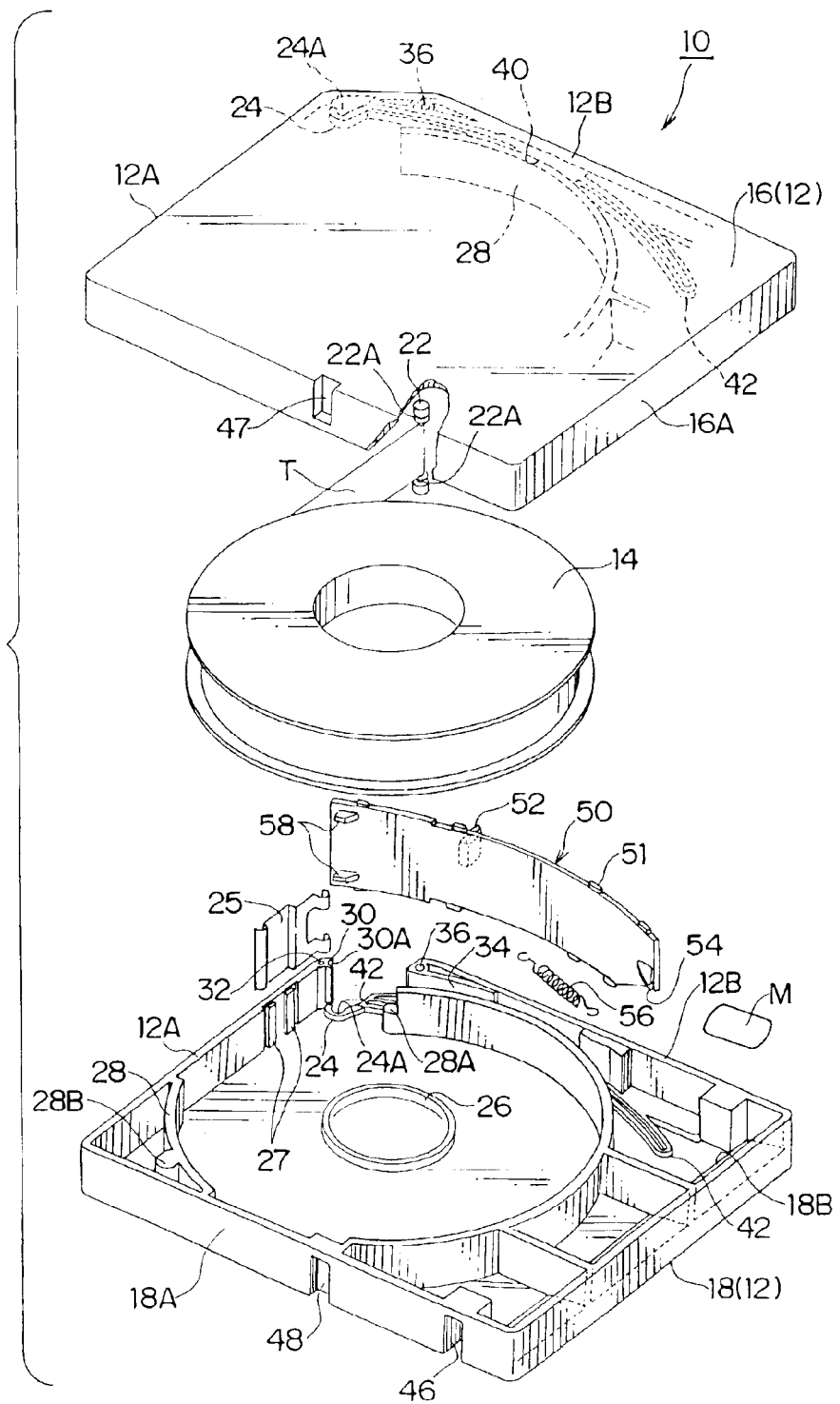
FIG. 2 is a schematic exploded perspective view of the recording tape cartridge.
Figure 3:
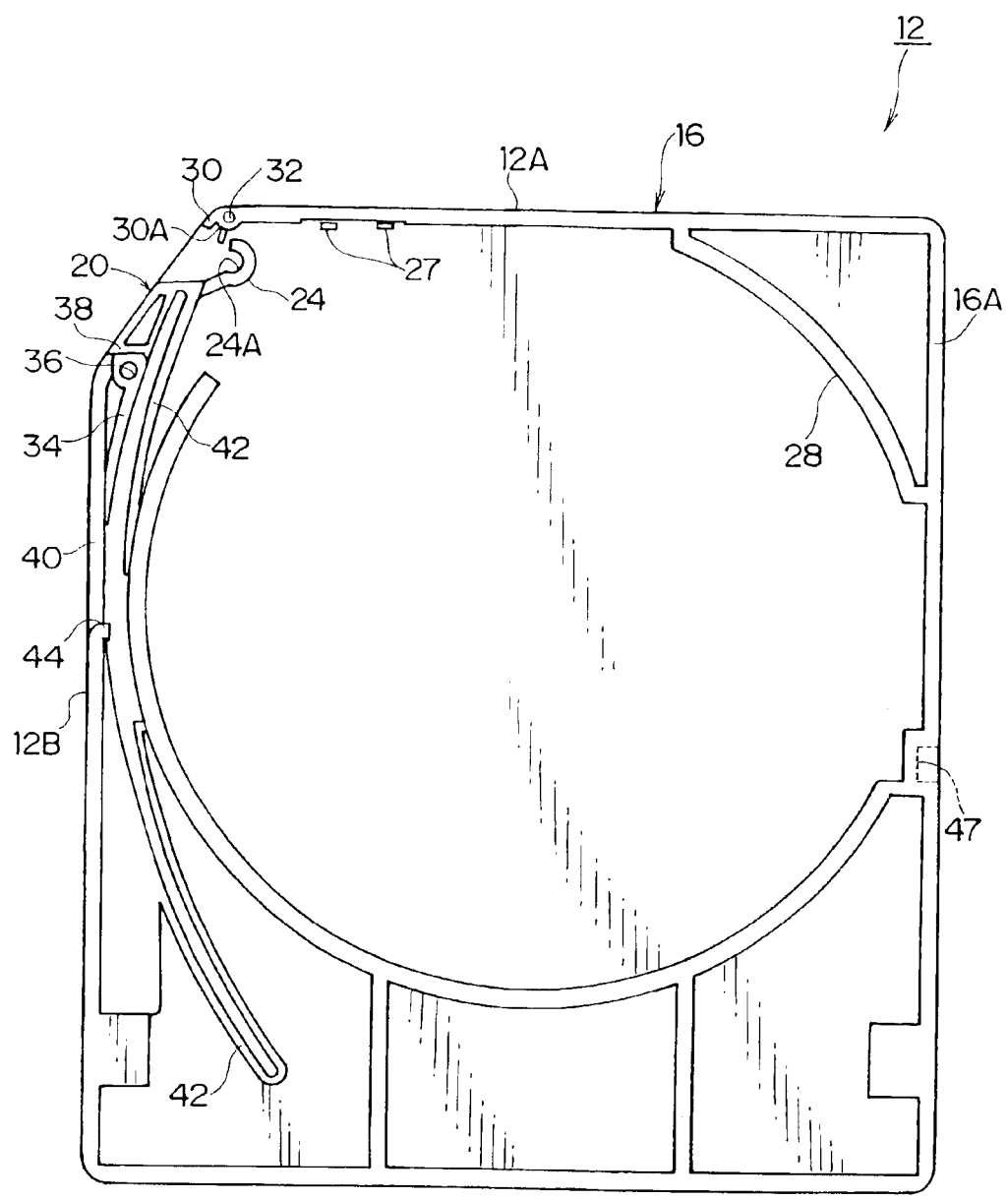
FIG. 3 is a schematic plan view of an upper case.
Figure 4:
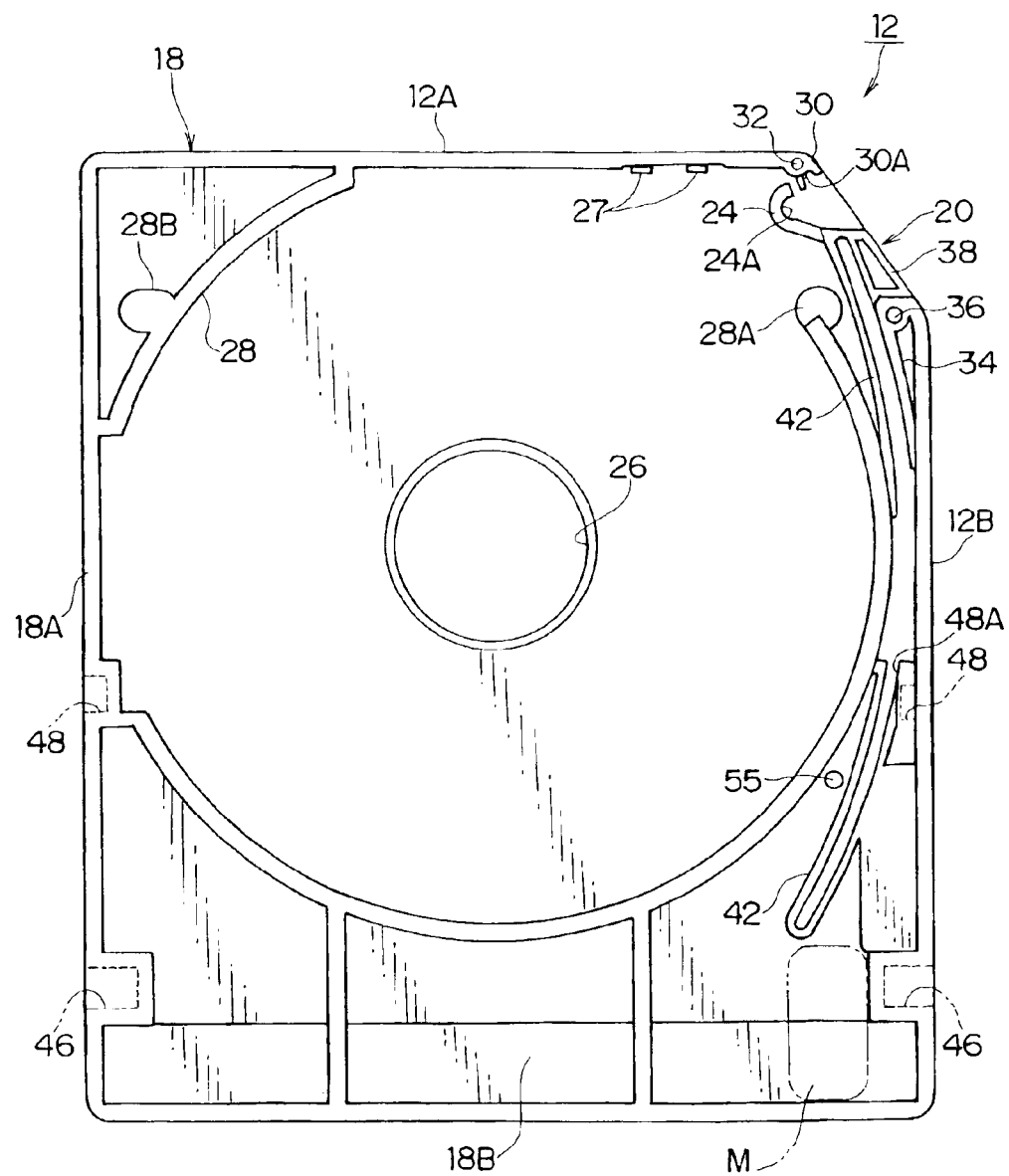
FIG. 4 is a schematic plan view of an lower case.
Figure 5:
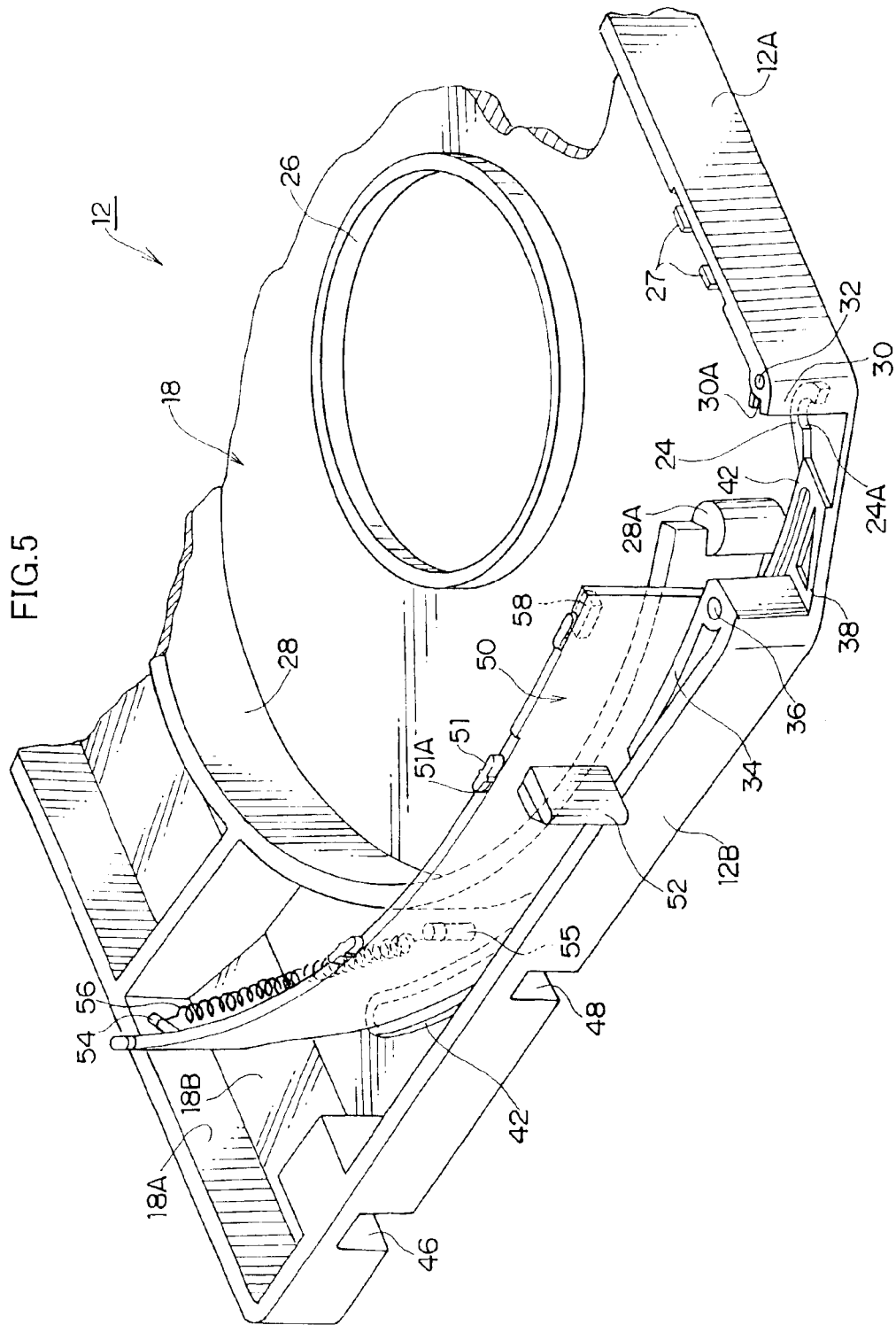
FIG. 5 is a schematic perspective view of a door in a state where an opening is opened.

FIG. 1 is a perspective view of the overall construction of the recording tape cartridge 10. FIG. 2 is a schematic exploded view of the recording tape cartridge 10. As shown in these figures, the recording tape cartridge 10 is constructed such that a magnetic tape T (recording tape) serving as an information record/playback medium is wound around a single reel 14, and the reel 14 with the wound magnetic tape T wound is accommodated rotatably in an accommodating case 12. The accommodating case 12 is shaped substantially rectangular in plan view.

The accommodating case 12 is constructed such that a pair of an upper case 16 and a lower case 18 are engaged and coupled through peripheral walls 16A and 18A. The upper and lower cases 16 and 18 each have a cut-off right-front corner portion, which is one angular potion on a top side in the direction of insertion to the drive device. In the inside, the accommodating case 12 has a space sufficient to store the reel 14 with the magnetic tape T being wounded therearound. The corner portion formed by cutting off portions of the peripheral walls 16A and 18A of the respective upper and lower cases 16 and 18. The corner portion thus formed is used as an opening 20 through which the magnetic tape T is pulled out.

An free end of the magnetic tape T pulled out of the opening 20 is connected to a leader pin 22 that is engageably pulled out by a pull-out means of the drive device. Annular grooves 22A are formed at two ends of the leader pin 22 protruding from cross-directional ends of the magnetic tape T. The annular grooves 22A are engaged with hooks or the like of the pull-out means. Thus, according to the construction described above, when the magnetic tape T is pulled out, the magnetic tape T can be prevented from being damaged due to contact with the hooks and the like.

In addition, a pair of upper and lower pin holders 24 used for positioning and holding the leader pin 22 are provided inside an opening 20 of the accommodating case 12. As shown in FIGS. 3 to 6, the pin holder 24 is shaped substantially semicylindrical, and two ends of the leader pin 22 standing upright are held in a concave portion 24. An outer peripheral wall of the pin holder 24 is formed open on the pull-out side of the magnetic tape T, and is used as an entrance/exit for the leader pin 22.

A leaf spring 25 is provided in the vicinity of the concave portion 24. A base portion of the leaf spring 25 is inserted between spring-holding portions 27 provided on an inner surface of a front wall 12A (outer surface portions of peripheral walls 16A and 18A in the direction of the arrow A). Thereby, the leaf spring 25 is engaged with upper and lower ends of the leader pin 22. The leaf spring 25 urges the leader pin 22 to be held to the pin holder 24 (refer to FIG. 6). When the leader pin 22 moves to or out from the pin holder 24, the leaf spring 25 is appropriately elastically deformed to allow the leader pin 22 to move.

In a central portion of the lower case 18, a gear opening 26 is provided to expose a reel gear (not shown) of the reel 14 to the outside. The reel gear is engaged with a drive gear (not shown) of the drive device, and the reel 14 is thereby driven to rotate in the accommodating case 12. The reel 14 is held without play by means of floating-control walls 28. The floating-control walls 28 are partly formed in such a manner as to protrude from inner surfaces of the individual upper and lower cases 16 and 18 as inner walls on a circular locus concentric with the gear opening 26.

A bag portion 28A including a position-control opening formed inside is integrally formed at the end of the floating-control walls 28 provided in the vicinity of the opening 20. A bag portion 28B including a long position control opening formed inside is integrally formed inside a left-front corner portion of the accommodating case 12. The bag portions 28A and 28B are disposed linear along the direction of the arrow B. Except the end portion at which the bag portion 28A is integrally formed, the end portion of each of the bag portions 28A is integrally formed with either of the peripheral walls 16A and 18A of the accommodating case 12. Thereby, the floating-control walls 28 individually partition the outside thereof from the space in which the reel 14 is set.

In a right-rear portion of the lower case 18, a memory board M containing various types of information is disposed in units of the recording tape cartridge 10. A rear inner wall 18B is formed with a sloped surface at a predetermined angle, and the memory board M is disposed with the slope at the predetermined angle. This way of disposition enables data detection in the drive device. The drive device reads data from the side of a lower surface and in a library device that reads data from the side of a rear wall. Furthermore, a write protector (not shown) is provided in a left-front portion of the lower case 18. The write protector is used to set whether data is recordable or non-recordable to the recording tape cartridge 10.

Constructions of the Opening and the Storing Case in the Vicinity of the Opening As described above, the opening 20 is formed in the cut-off right-front corner portion to have the opening face in the directions of the arrows A and B. Therefore, the pull-out means of the drive device can access the leader pin 22 either along the directions of the arrows A and B or through a portion between the directions of the arrows A and B, and can chuck the leader pin 22. This enables a large mountable area to be obtained for the pin holder 24, which is used to hold the leader pin 22, and a large chuckable region of the leader pin 22 in compliance to specifications of the drive device that chucks the leader pin 22. Accordingly, degree of freedom can be increased for design work.

In addition, a pair of short upper and lower sloped wall portions 30 are provided in a right end portion of a front wall 12A of the accommodating case 12. The sloped wall portions 30 define a front peripheral portion of the opening 20. The sloped wall portions 30 are each formed bent along the opening face of the opening 20 to be thicker than the front wall 12A. A concave portion 30A with which the end of a door 50 (described below) engages is provided in a central portion of the sloped wall portion 30 in the thickness direction thereof. A pair of upper and lower screw bosses 32 is integrally formed inside the front wall 12A in the vicinity on the left side of the sloped wall portion 30.

A pair of upper and lower sloped wall portions 34 are provided inside a front end portion of right wall 12B (portion of the peripheral walls 16A and 18A in the direction of the arrow B) of the accommodating case 12. Each of the sloped wall portions 34 is shaped substantially along an outer peripheral surface of the door 50 (described below) in plan view. Front end portions of the sloped wall portions 34 define a rear peripheral portion of the opening 20. A pair of upper and lower screw bosses 36 are provided in front end portions of the sloped wall portions 34. The inner surfaces of the sloped wall portions 34 function to prevent play of the door 50 during slidable movement thereof.

In addition, though the right wall 12B of the accommodating case 12, a slit 40 having a predetermined length is provided to be used as a window portion for communication of between the inside and the outside of the accommodating case 12. Specifically, the slit 40 is used to expose an operation protrusion 52 of the door 50. The slit 40 is formed by cutting off a front lower portion of the peripheral wall 16A of the upper case 16 constituting the right wall 12B, and is thereby formed open also toward the opening 20. Thus, the outer surface of the screw boss 36 in the upper case 16 is exposed through the slit 40 (refer to FIG. 1).

The slit 40 described above may be formed such that an upper end thereof is defined only by a top plate of the accommodating case 12 (top plate of the upper case 16). The peripheral wall 16A may be partly remained to maintain the stiffness of the accommodating case 12, such as the strength against a drop-causing impact. In this case, the upper wall defining the slit 40 may be provided integral from the sloped wall portion 34.

A concave portion 44 is provided on the peripheral wall 16A defining a rear end of the slit 40 in such a manner as to protrude inwardly of the side the accommodating case 12. The concave portion 44 is used to prevent entrance of dust into the accommodating case 12 and to prevent play of the door 50. A concave portion 48 (cut-off portion of the bottom plate) is formed further rearwardly from the concave portion 44 in the lower case 18 (refer to FIG. 4). The concave portion 48 is formed such that a portion excluding an upper end of the peripheral wall 18A is concave similarly to the form of the letter "U" inwardly of the accommodating case 12 and, in addition, is concave upwardly from the lower surface of the accommodating case 12.

Another concave portion 48 is formed on the left wall of the accommodating case 12. This concave portion 48 is used, for example, as an engagement portion with which a pull-in means of the drive device is engaged. In addition, for example, a bottom surface (downward surface) of the concave portion 48 is used as a reference surface for performing positioning in the drive device. Further, a concave portion 46 (cut-off portion of the bottom plate) is formed on a rear portion of the concave portion 48. The concave portion 46 is formed such that a portion excluding an upper end of the peripheral wall 18A is concave substantially in the form of the letter "U" inwardly of the accommodating case 12 and, in addition, is concave upwardly from the lower surface of the accommodating case 12. The concave portion 46 is used as an engagement portion with which a holding means of the library device is engaged.

The concave portions 46 and 48 thus provided work to increase the torsional strength of the accommodating case 12 (lower case 18). An inside portion of the right wall 12B (peripheral wall 18A) defining the concave portion 48 is arcuated corresponding to the outer surface of the door 50. This inside portion serves as a guide surface 48A for preventing play of the door 50 that slidably moves when the opening 20 is opened and closed. In addition, a concave portion 47 is formed in a portion corresponding to the portion of the concave portion 48 provided to the left wall of the upper case 16. The concave portion 47 is used as an engagement portion for engaging a holding member for canceling rotation moment occurring the movement in the opening direction of the door 50 in the state where the opening 20 is kept open.

In each of the upper and lower cases 16 and 18, a guide wall 42 having a predetermined height (for example, approximately in a range of from 1.0 to 1.5 mm) is provided. The guide wall 42 extends from the vicinity of the opening 20 to the vicinity of a position at which the floating-control walls 28 is proximate to the accommodating case 12 (the position hereinbelow will be referred to as the "first half"). In addition, the guide wall 42 extends to the vicinity of the rear wall either from the concave portion 44, which defines the rear end of the slit 40, or from the concave portion 44 (the position hereinbelow will referred to as the "second half"). The guide wall 42 described above supports a convex portion 51 of the door 50 (described below) in such a manner as to sandwich it from two sides of an inner surface and an outer surface thereof.

In more specific, the guide wall 42 is formed as described hereunder. An outer rear end portion of the first half is integrally formed with the inner surface of the right wall 12B; and an inner rear end portion of the first half is integrally formed with the outer surface of the floating-control walls 28. An outer rear end portion of the second half is integrally formed with the inner surface of either the concave portion 44 or the concave portion 48; and inner rear end portion of the second half is integrally formed with the outer surface of the floating-control walls 28. The guide walls 42 in the upper and lower cases 16 and 18 are formed mutually different in length. Specifically, the second half of the guide wall 42 in the upper case 16 is formed longer than that in the lower case 18.

The guide walls 42 are thus formed different in the length for the reason the rear inner wall 18B of the lower case 18 is formed as the sloped surface having the predetermined angle, and the memory board M is disposed on the side of the right wall 12B. In the second half of the guide wall 42, a rear end portion thereof is blocked substantially arcuate in plan view. Thereby, the guide wall 42 controls the rear-end convex portion 51 in each of the upper and lower sides so that the door 50 cannot move further backward therefrom.

The first half of the guide wall 42 is formed extending up to a position where the front end portion thereof does not hinder entrance and exit movements of the leader pin 22 in the event the leader pin 22 moves outside and inside. In the drawings, the position corresponds to a portion located on a further rearside of the pin holder 24, and the distance to the position is approximately equivalent to the half of the width of the opening 20. In addition, similar to the case of the second half, the first half of the guide wall 42 is blocked, and the foremost convex portion 51 in each of the upper and rear sides is thereby regulated so that the door 50 cannot move further forward therefrom. Dimensions of individual portions are determined so that the front end of the door 50 engages in the concave portion 30A of the sloped wall portion 30 in the state described above.

Moreover, the first half of the guide wall 42 is formed somewhat lower than the second half of the guide wall 42. Specifically, the first half of the guide wall 42 is formed to a height of around 1 mm, whereas the second half of the guide wall 42 is formed to a height of around 1.5 mm. The guide wall 42 is thus formed to secure spacing of the opening 20 to be sufficient to allow entrance of the pull-out means of the drive device that chucks the leader pin 22 to pull it out. For this reason, as described below, the door 50 in the first-half portion (at least a portion for blocking the opening 20) to have a plate width (height) larger (higher) by the smaller height of the guide wall 42.

Further, on an inner surface of each of the upper and lower cases 16 and 18, a rib 38 is formed integral with the outer guide wall 42 exposed to the outside through the opening 20 to have a substantially trapezoidal shape in plan view. In addition, the rib 38 is formed to a height identical to the height of the aforementioned guide wall 42. The rib 38 works to secure the strength of each of the upper and lower cases 16 and 18 in the portion of the opening 20. The inner guide wall 42 is integrally formed with the pin holder 24. However, the pin holder 24 is preferably formed to a height substantially identical to or higher than the height of the integrally formed guide wall 42.

In the construction described above, the upper case 16 and the lower case 18 are fixed (coupled) with screws (not shown) screwed from the underside into the screw bosses 32 and 36 positioned in the vicinity of the opening 20. The corner portions at two ends of the opening 20 are insufficient in strength and tend to collide with the ground in an event the accommodating case 12 is dropped. However, in the construction described above, the corner portions are defined by individual free ends of the sloped wall portion 30 (front wall 12A) and the sloped wall portions 34 (right wall 12B) and are coupled strong. Therefore, even when dropped, the accommodating case 12 is neither deformed nor buckled due to the weight of the overall recording tape cartridge 10.

For example, in the construction, the outer thread diameter of the screw is $\phi$2.0 mm, and the outer diameters of the screw boss 32 and the screw boss 36 is $\phi$4.0 mm. However, instead of the construction using screw-fixing, the construction may be arranged such that protrusions extending from the upper case 16 are formed to protrude in positions corresponding to the screw bosses 32 and 36, fitted openings are formed on the lower case 18 for fitting with the protrusions, and the protrusions and the fitted openings are fitted with each other. In this case, however, the upper case 16 and the lower case 18 are often screw-fixed within a 30-mm radius of an fitting position. In addition, while engagement surfaces (two-side corner portions of the opening 20) of the peripheral walls 16A and 18A may be melt-fixed; screw-fixation is often in view of disassemblability and recyclability.

In the individual upper case 16 and lower case 18, an area where the pin holder 24 is disposed is formed to a thickness of 2 mm, which is relatively large; and the accommodating case 12 (upper and lower cases 16 and 18) are formed of a polycarbonate (PC) material. This is because an increased strength is required in the vicinity of the pin holder 24, which is a holding (positioning) position of the leader pin 22 (required to be properly engaged with the pull-out means, which is one of most important functions of the recording tape cartridge 10, when the recording tape is pulled out). In addition, a position offset of the leader pin 22 needs to be prevented from occurring when, for example, the accommodating case 12 (recording tape cartridge 10) is dropped. Meanwhile, instead of using the aforementioned polycarbonate material (PC), the accommodating case 12 may be formed using either an acrylonitrile-butadiene-styrene (ABS) material or a metal material.

Figure 6:
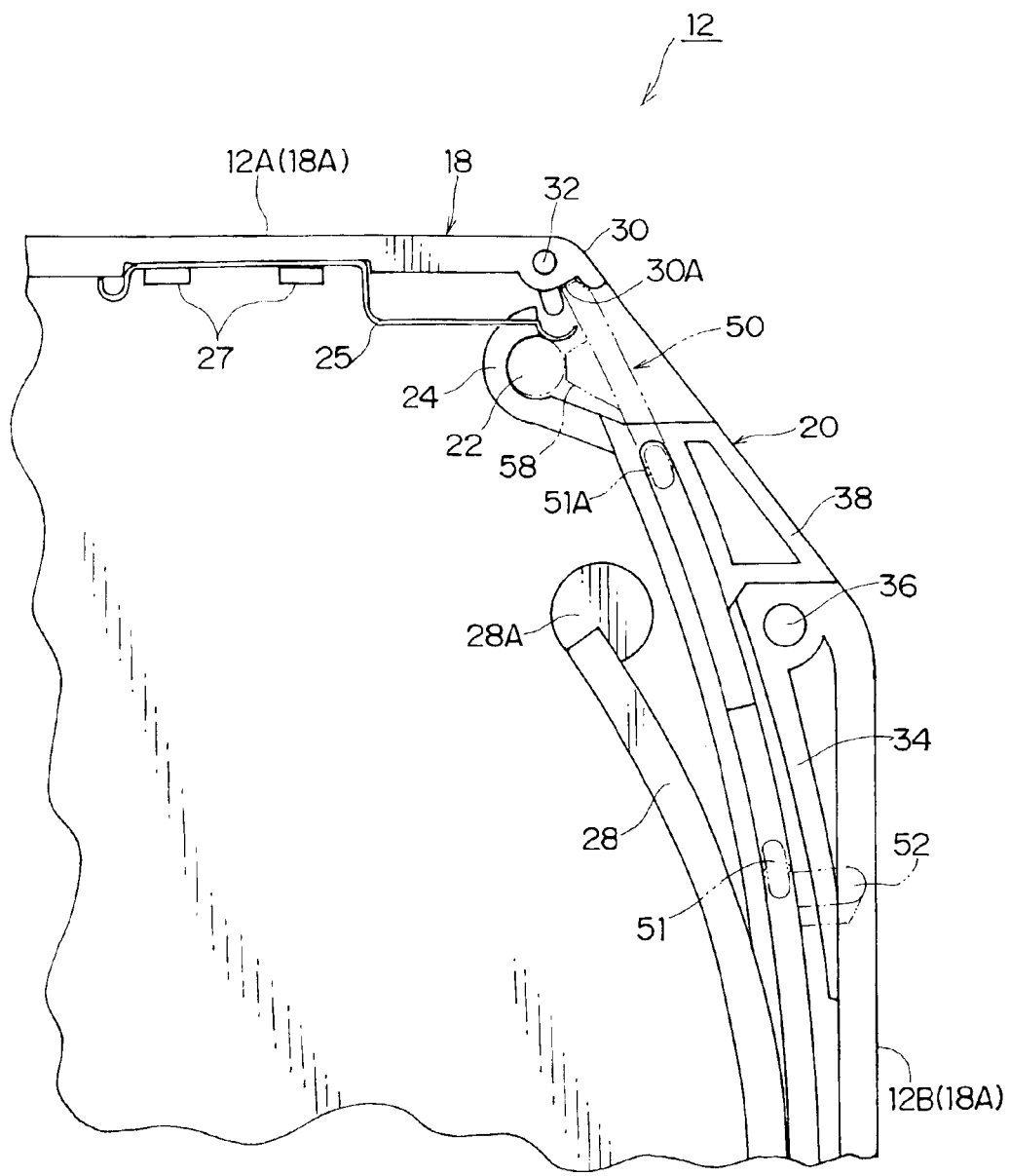
FIG. 6 is an explanatory view showing a configuration in the vicinity of the opening.

The position where the pin holder 24 is disposed is determined such that an axial center of the leader pin 22 held by the pin holder 24 is either positioned on a first virtual line connecting front and rear end portions of the opening 20 or positioned further inward of the accommodating case 12 than the first virtual line. Depending on the case, the position is determined such that the aforementioned axial center is either positioned on a second virtual line connecting axial centers of the two screw bosses 32 and 36 or positioned further inward of the accommodating case 12 than the second virtual line. In addition, as shown in FIG. 6, according to the present embodiment, the pin holder 24 is disposed in a position closer to the screw boss 32 than to the screw boss 36. Thereby, the construction is further strengthened to prevent the position offset of the leader pin 22 that can be caused by vibrations occurring with the top plate and the bottom plate when, for example, the accommodating case 12 is dropped.

As viewed in plan view, the inclination angle of an opening face of the opening 20 to the direction of the arrow A (inclination angle of the top and bottom plates of the accommodating case 12 that define the upper and lower portions of the opening 20) are determined according to requirements for identification (recognition) of the recording tape cartridge 10 in the library device. More specifically, the library device contains a plurality of recording tape cartridges 10, and automatically operates (without requiring manual operation) to either attach the recording tape cartridge 10 to the drive device or to detach it therefrom. When the library device handles recording tape cartridges 10 of multiple types and drive devices of multiple types, the library device needs to recognize generations and recording capacities of the individual recording tape cartridges 10. For the recognition, the inclination angle of the opening face of the opening 20 can be used.

Thus, the opening 20, through which the magnetic tape T is pulled out, is formed incorporating the above-described considerations regarding for the strength. The opening 20 concurrently plays the role of recognizing the portions in the library device through the inclination angle of the opening faces (specifically, the inclination angle of the top and bottom plates defining the upper and lower portions of the opening 20). If the opening 20 and the recognizing portion were separately provided (for example, if one or more through-holes were provided as recognizing portions in the accommodating case 12), problems could occur in that, for example, the strength and dust-proof characteristics of the accommodating case 12 are reduced, and metal molds having complicated structures need to be used. However, the opening 20 formed as described above prevents these problems. Meanwhile, in the accommodating case 12, since the peripheral wall 16A of the upper case 16 is as high as the peripheral wall 18A of the lower case 18, processing precisions (resin-molding precisions dependent on molds) are substantially the same. Therefore, high assemblability and drop-causing-impact resistance can be obtained.

Construction of Door

Figure 7:
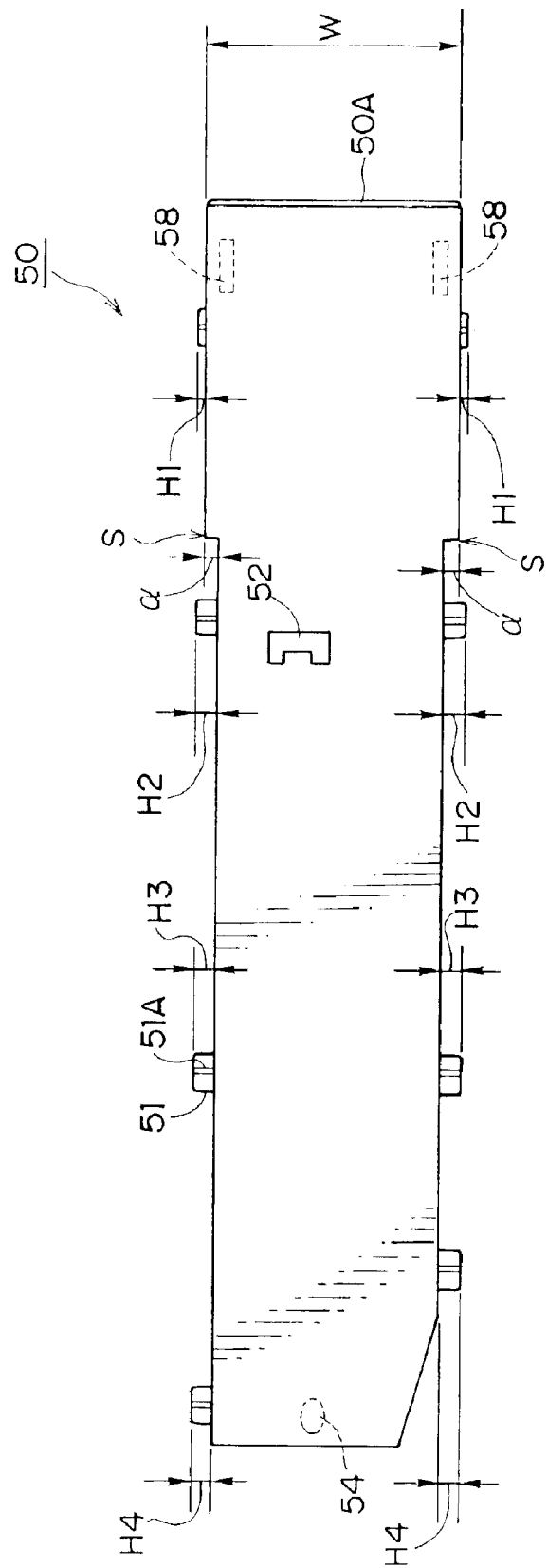
FIG. 7 is a side view of the door.
Figure 8:
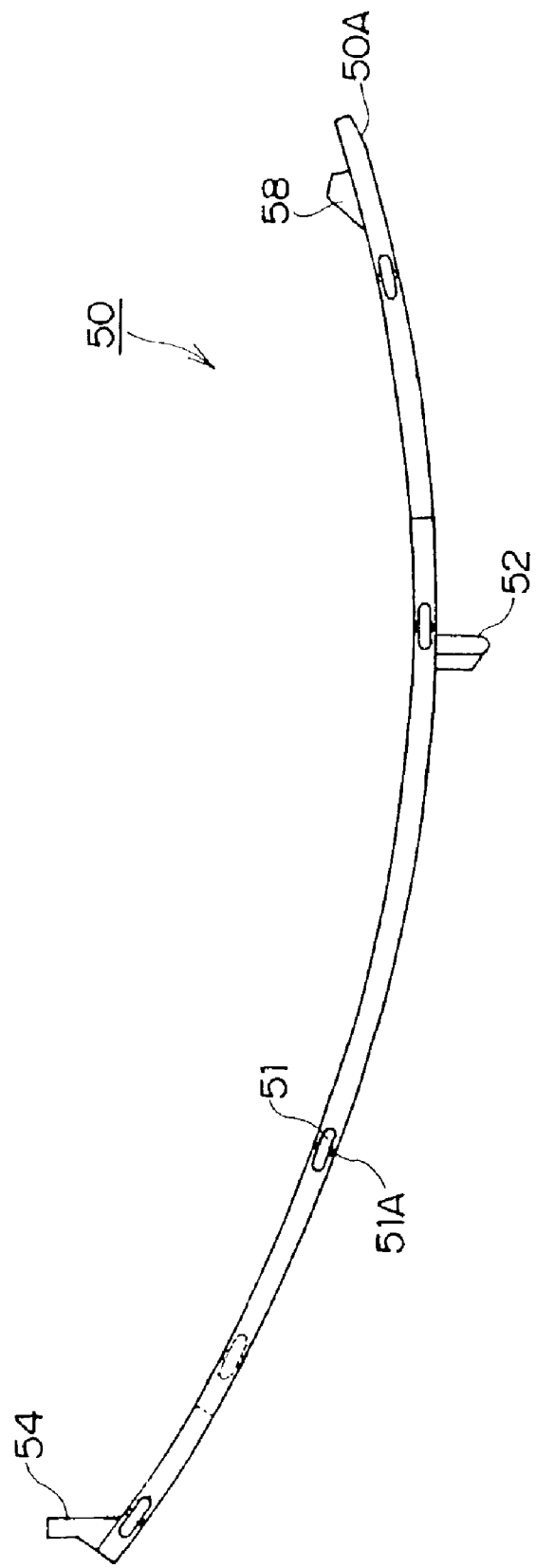
FIG. 8 is a plan view of the door.

As described above, the opening 20 is opened and closed by the door 50 provided as a shielding member. As shown in FIGS. 5 to 11, the door 50 is formed such that a plate width W (height) of a portion (at least a portion for blocking the opening 20) where the first-half guide wall 42 slides is substantially the same opening height as the height of the opening 20 (FIG. 7). In addition, a plate width (height) of a rear portion extending rearwardly from the aforementioned portion (rear portion extending rearwardly from a boundary portion S) is slightly smaller (lower) ($\alpha$=around 1 mm), and a plate length is sufficiently larger than an opening width of the opening 20 (FIG. 7). The door 50 is U-formed substantially arcuate in the plate-thickness direction (in plan view) to be movable along a predetermined circumference.

The door 50 is constructed as described hereunder. The door 50 blocks the opening 20 in a state where an end portion of the door 50 engages into the concave portion 30A of the sloped wall portion 30 (FIG. 11A), slidably moves (pivots) to a substantially rear portion along the predetermined circumference, and thereby opens the opening 20 (FIG. 11B). Then, when an outer peripheral surface in the vicinity of the end has reached the vicinity of the screw boss 36, the door 50 fully opens the opening 20 (FIG. 11C). In contrast, the door 50 slidably moves (pivots) in the direction opposite to the direction for opening the opening 20, and thereby blocks the opening 20.

As described above, the door 50 is U-formed arcuate corresponding to the circumference predetermined as a movement locus thereof. In the present embodiment, a center of the rotational movement (pivot center) is determined such that the position in the left-right direction is set to the vicinity of the left end of the accommodating case 12, and the position in the front-rear direction is set to the vicinity of the rear end of the slit 40. Thereby, the movement locus of the door 50 becomes proximate to the right wall 12B of the accommodating case 12 in the vicinity of the slit 40. The rotation center and radius of the door 50 may appropriately be determined according to, for example, the positions of front and rear end portions (such as the sloped wall portion 30 and the screw boss 36) of the opening 20 and the opening-face angle of the opening 20. The positions of the front and rear end portions are determined according to requirements of the drive device, and the opening-face angle is determined according to requirements of the library device.

Figure 11A:
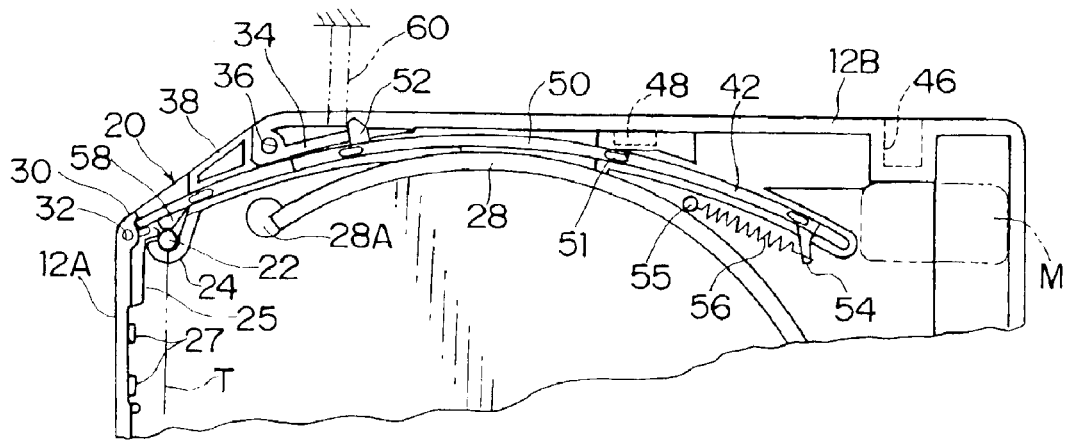
FIGS. 11A, 11B, and 11C are schematic explanatory views showing processes of opening operations of the door.
Figure 11B:
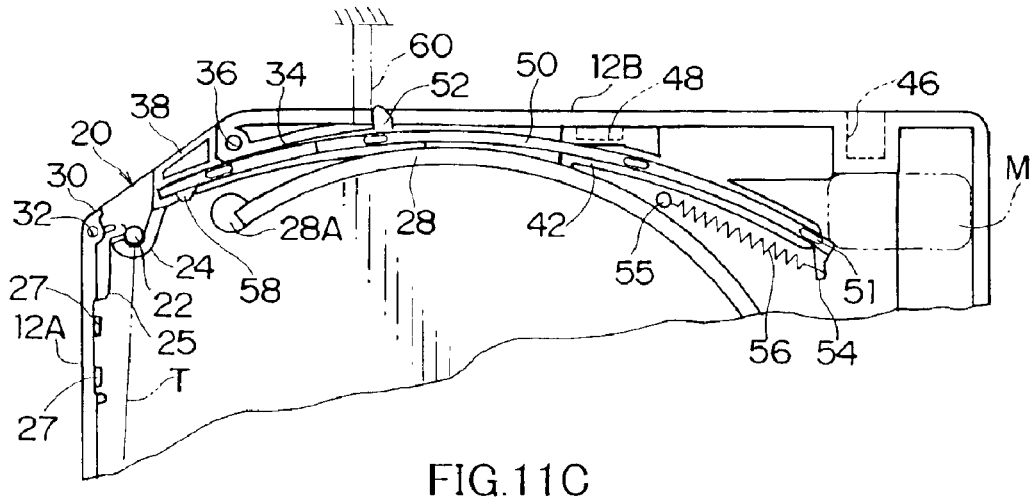
Figure 11C:
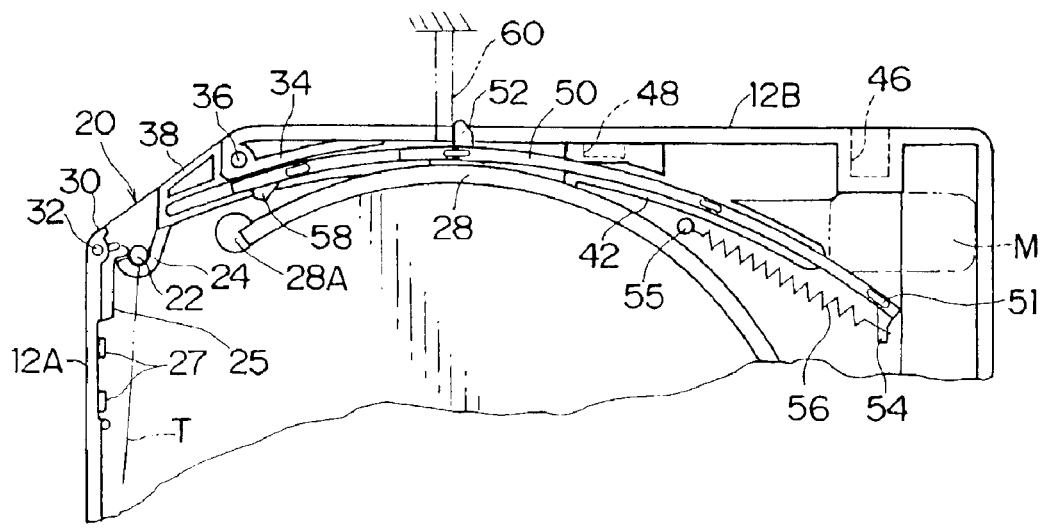
Figure 12:
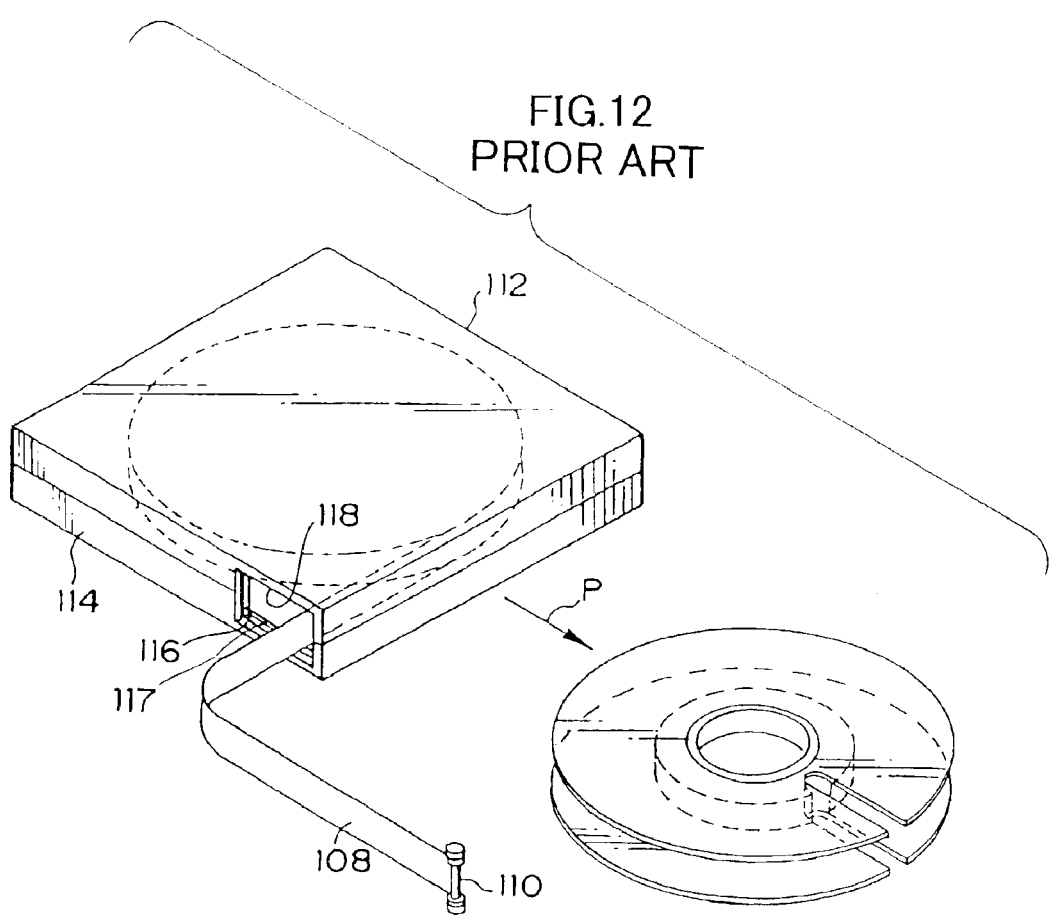
FIG. 12 is a schematic perspective view of a conventional recording tape cartridge including a leader pin.
Figure 13:
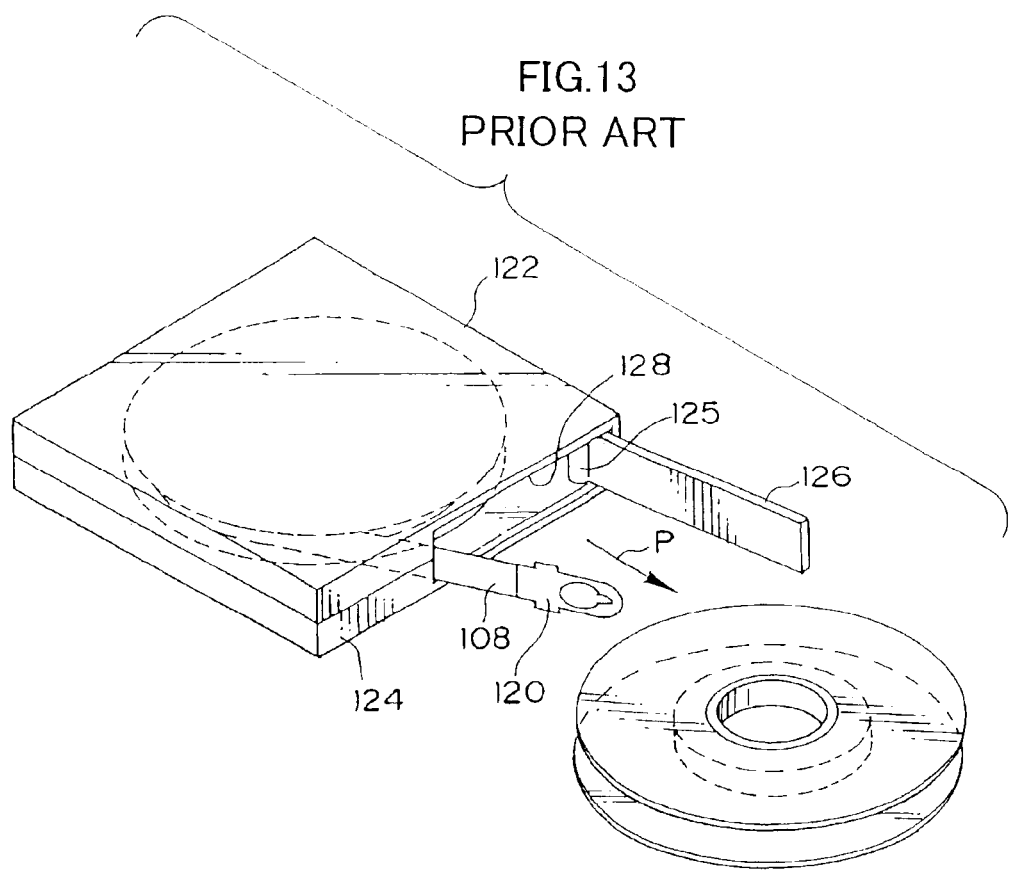
FIG. 13 is a schematic perspective view of a conventional recording tape cartridge including a leader pin.
Figure 14:
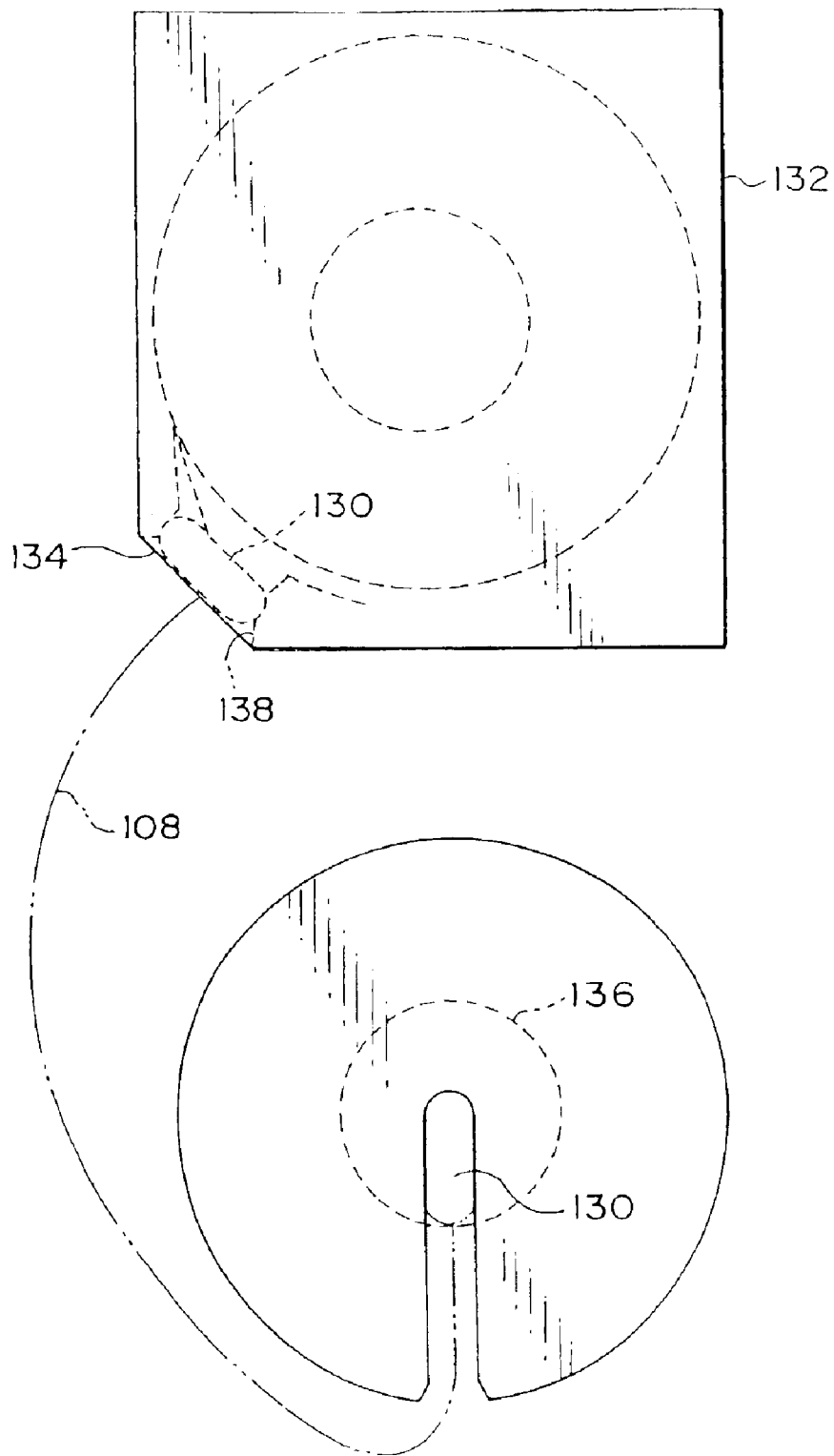
FIG. 14 is a schematic plan view of a conventional recording tape cartridge including a leader block.

The lengthwise dimension of the U-formed portion of the door 50 is determined such that the rear end thereof is positioned within a right rear corner portion (in the vicinity of the concave portion 46) located rearward from the concave portion 48 in the state where the opening 20 is blocked (refer to FIGS. 11A to 11C). Thus, in the overall stage of blocking the opening 20, the door 50 is constructed to slide while play is being suppressed by the sloped wall portions 34, concave portion 44, and guide surface 48A of the accommodating case 12. A rear-lower portion of the door 50 is diagonally cut off to escape from the memory board M disposed on the sloped surface of the rear inner wall 18B of the lower case 18.

Convex portions 51 are individually provided on an upper surface and a lower surface of the door 50. The convex portions 51 abut guide surfaces (mutually opposing inner surfaces) of the guide walls 42 and an inner surface of the upper case 16 and an inner surface of the lower case 18 between the guide walls 42 to thereby guide the door 50 along the opening/closing direction. The convex portions 51 are provided to reduce sliding resistance (friction) among the individual guide surfaces of the guide walls 42, the individual inner surfaces of the upper and lower cases 16 and 18 between the guide walls 42, and the door 50. As shown in FIGS. 7 to 10B, the convex portions 51 are each formed substantially elliptical (in plan view) along the lengthwise direction of the door 50, and four pieces thereof protrude on each of the upper and lower surfaces of the door 50 to be vertically symmetric except for the rearmost the convex portions 51. The rearmost convex portions 51 are provided asymmetric for the reason that the rear-lower portion of the door 50 is diagonally cut off.

Each of the convex portions 51 may be formed to substantially the same height as that of the guide wall 42. For example, referring to FIG. 7, a height H of the convex portion 51 provided forwardly from the boundary portion S of the different plate widths of the door 50 is 0.5 mm from the upper or lower surface of the door 50. Since the plate width of the door 50 is low by about 1.0 mm on each of the upper and lower sides, heights H2, H3, and H4 of the rear convex portions 51 are each 1.5 mm from the upper or lower surface. In a certain case, the convex portions 51 are formed to gradually be lower in positions remote farther from the opening 20. For example, the heights H2, H3, and H4 of the convex portions 51 formed in portions other than a portion where the foremost convex portion 51 are lower than the height H1 of the foremost convex portion 51 by the difference ($\alpha$=about 1.0 mm) in the plate width.

More specific examples of design values will be described hereunder. For example, suppose the heights H1 (heights from the upper and lower surfaces of the door 50) of the foremost convex portions 51 are each set as H1=0.5 mm. In this case, the plate width in the portion where the second foremost convex portions 51 is formed is lower than the foreside plate width W by 1.0 mm on each of the upper and lower sides. Hence, the convex portions 51 are each formed to a height of H2=1.4 mm (0.1 mm lower than H1) including the difference in the width. Also in the case of the heights H3 of the third foremost convex portions 51, the plate width in the portion where the third foremost convex portions 51 is formed is lower than the foreside plate width W by 1.0 mm on each of the upper and lower sides. Hence, the convex portions 51 are each formed to a height of H3=1.3 mm (0.2 mm lower than H1) including the difference in the width. Also in the case of the heights H4 of the last (rearmost) convex portions 51, the plate width in the portion where the last convex portions 51 is formed is lower than the foreside plate width W by 1.0 mm on each of the upper and lower sides. Hence, the convex portions 51 are each formed to a height of H2=1.25 mm (0.25 mm lower than H1) including the difference in the width.

As described above, the foremost convex portion 51 is formed to substantially the same height as that of the guide wall 42. Thereby, when the opening 20 is closed, the door 50 can be prevented from being disengaged from the guide wall 42, and play between the guide wall 42 and the door 50 can be suppressed. In addition, for engagement to the guide wall 42, in comparison to the foremost convex portion 51 (formed in the portion for blocking the opening 20), the rearside convex portions 51 for which the same height as that of the foremost convex portion 51 is not required are each formed to the smaller height. Thereby, the area in contact with the guide surface of the guide wall 42 can be reduced; and consequently, the sliding resistance (friction) can even more be reduced.

As described above, depending on the case, the convex portions 51 are formed to have heights gradually reduced as the positions thereof are spaced away toward the rearside. In this case, however, it is sufficient that at least the rearside convex portions 51 are each formed to a height less than the height of the foremost convex portion 51. Therefore, suppose the foremost convex portion 51 is formed to a height of H1=0.5 mm. In this case, the other rearside convex portions 51 may be formed to have heights including the difference ($\alpha$=about 1.0 mm) in the plate width of the door 50, as H2=1.3 mm (0.2 mm lower than H1) and H3=H4=1.25 mm (0.25 mm lower than H1 in either of the cases).

Figure 9:
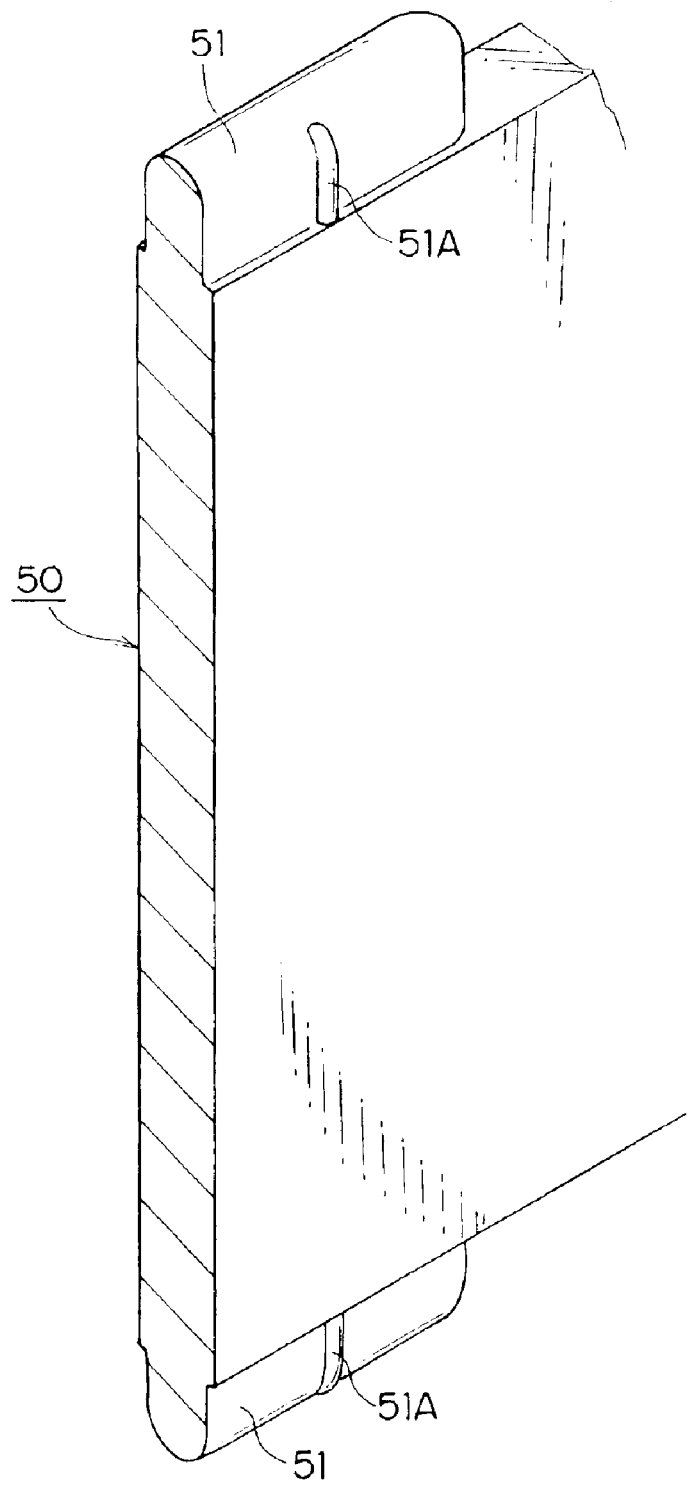
FIG. 9 is a schematic cross-sectional view showing shapes of convex portions of the door.
Figure 10A:
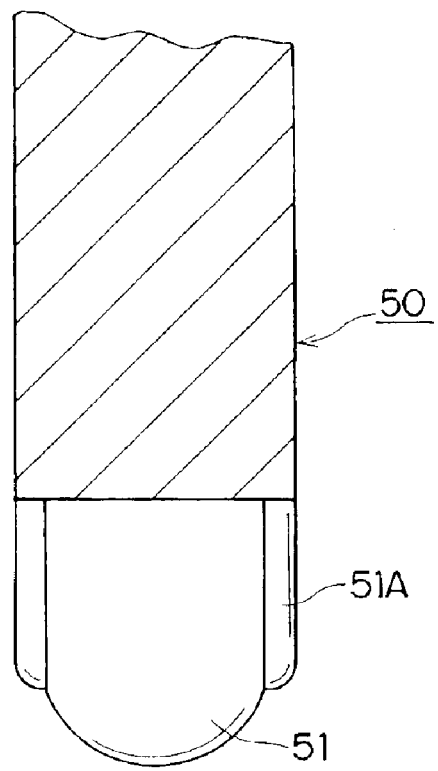
FIGS. 10A and 10B are schematic cross-sectional views each showing a convex portion of the door.
Figure 10B:
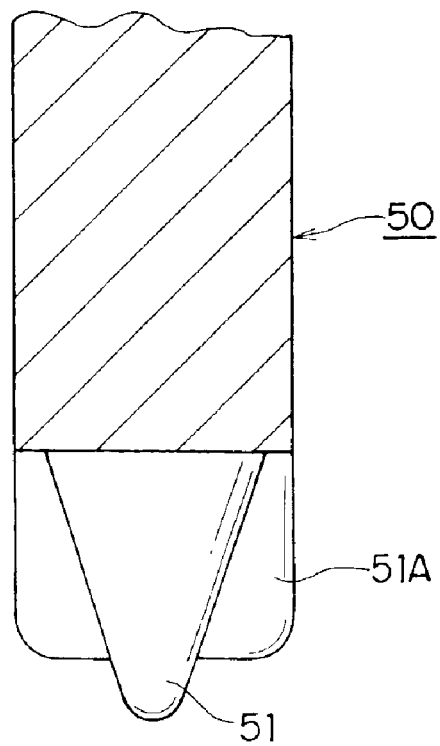

In addition, as shown in FIGS. 9, 10A, and 10B, the convex portion 51 is formed such that each of the upper surface and the lower surface thereof is shaped to include a substantially wide circular arc (FIG. 10A) or a narrow circular arc (FIG. 10B) in cross-sectional view (side view). Further, a protrusion 51A having either a shape including a substantially circular arc in plan view or a substantially triangular shape in plan view is formed on each sidewall of the convex portion 51. Therefore, when the convex portions 51 are inserted between the guide walls 42 and are slidably moved, only the substantially arcuate end of the convex portion 51 contact either the inner surface of the upper case 16 or the inner surface of the lower case 18 in the manner of linear contact. Concurrently, only the tip of the protrusion 51A, which has the substantially arcuate shape or the like, contacts each of the mutually opposing guide surfaces of the guide walls 42 also in the manner of line contact.

The above arrangement enables reduction in the sliding resistance (friction) among the individual upper and lower convex portions 51, the individual inner surfaces of the upper and lower cases 16 and 18, and the individual guide surfaces of the guide walls 42. Consequently, the door 50 can be caused to slide smoothly. The convex portion 51 provided as a friction-reducing device, as described above, is not limited to that shown in the individual drawings, and arbitrary means may be employed as long as the means performs either linear contact or point contact but not to perform surface contact. For example, a substantially semispherical protrusions or the like may be formed on two sides of the convex portion 51. Meanwhile, the convex portion 51 formed substantially elliptical in plan view is superior in impact resistance to a convex portion 51 formed substantially circular in plan view. Hence, even when a force is imposed on the door 50 from a direction other than the opening/closing direction, there is no concern that the convex portion 51 will be broken thereby.

In addition, as an operation portion, the operation protrusion 52 is formed along the radial direction of the door 50 on the outer peripheral surface in a portion located slightly forward from a longitudinal central portion of the door 50 (in the vicinity of the boundary portion where the plate width of the door 50 is different). The operation protrusion 52 is exposed to the outside of the accommodating case 12 through the slit 40. In the closed state of the opening 20, the operation protrusion 52 is positioned in a portion slightly spaced away from the rear end of the screw boss 36, and can be operated through a portion opened forward in the slit 40.

In the opened state of the opening 20, the operation protrusion 52 is positioned in a portion slightly spaced away from the rear end of the slit 40. Dimensions of the individual portions are determined such that, in the above-described state, the rearmost convex portion 51 abuts the rear end portion of the guide wall 42, and concurrently, the length direction of the operation protrusion 52 is perpendicular to the right wall 12B of the accommodating case 12 (direction of the arrow A).

The inside and outside of the accommodating case 12 are communicated through the slit 40 provided for exposing the operation protrusion 52. In this connection, the slit 40 is substantially closed by the screw boss 36 at all times, the door 50 extending to substantially the overall height of the accommodating case 12, and the concave portion 44 formed to guide the door 50. Concurrently, the floating-control walls 28 prevent adhesion of dust and the like to the magnetic tape T wound around the reel 14.

In addition, a spring-holding portion 54 is protrusively provided in an inner peripheral portion in the vicinity of the rear end of the door 50. One end portion of a coiled spring 56 is engageably held to the spring-holding portion 54. The other end portion of the coiled spring 56 is engaged with a spring engagement portion 55 provided in the vicinity of the concave portion 48 in the accommodating case 12. In this configuration, the door 50 is urged by an urging force F (refer to FIG. 5) of the coiled spring 56 for all times in the blocking direction of the opening 20, and the opening 20 is thereby closed. The spring-holding portion 54 shown in the drawings is disposed substantially on the centerline of the door 50, as viewed in side view. However, the spring-holding portion 54 is preferably disposed to align with the operation protrusion 52.

The coiled spring 56 working as urging means, as described above, has a length that allows the door 50 to reach the right-rear corner portion of the accommodating case 12 in the closed state of the opening 20. Therefore, the coiled spring 56 can be disposed effectively using a space between the floating-control walls 28 in the right-rear corner portion and the right wall 12B (peripheral walls 16A and 18A). On an inner surface of a front end portion of the door 50, stoppers 58 are protrusively formed that individually abut side faces of the upper end portion and the lower end portion of the leader pin 22 in the closed state of the opening 20. Thereby, the leader pin 22 can be prevented even more securely from being disengaged from the pin holder 24 due to, for example, a drop-causing impact dropping impact.

Depending on the case, an inner surface or an outer surface of a front end portion of the door 50 that engages in the concave portion 30A is tapered for smooth engagement. Referring to the drawings, a tapered surface 50A is formed on the outer surface side of the illustrated door 50. Meanwhile, the door 50 is formed of, for example, a polyoxymethylene (POM) resin that has high wear resistance and a low abrasion coefficient. However, the operation protrusion 52, the spring-holding portion 54, and the like may be formed as independent units (using different materials).

Hereinbelow, operation of the present embodiment will be described. In an unused time (for example, in a stocked time and a transportation time), the opening 20 is kept closed by the door 50. Specifically, the opening 20 is closed by the door 50 such that the end portion (front end portion) of the door 50 is engaged into the concave portion 30A of the sloped wall portion 30 according to an urging force of the coiled spring 56. Then, an outer peripheral surface of a central portion substantially contacts the inner surface of the sloped wall portion 34, and thereby blocks the opening 20.

When using the magnetic tape T, the recording tape cartridge 10 is inserted into the drive device along the direction of the arrow A. Following the insertion, an engagement protrusion 60 enters the slit 40 opened forward and then engages the operation protrusion 52 of the door 50, as shown in FIG. 11A. The engagement protrusion 60 is an opening/closing member that constitutes opening/closing means of the drive device. In this state, when the recording tape cartridge 10 (accommodating case 12) is pushed into the drive device, while opposing the urging force of the coiled spring 56, the engagement protrusion 60 backwardly moves the operation protrusion 52 according to a push-in force forces (the operation protrusion 52 is moved backward in relation to the accommodating case 12).

Subsequently, the door 50, on which the operation protrusion 52 is formed, is operated such that the convex portions 51 are guided by the guide walls 42; and the outer peripheral surface is regulated by the sloped wall portion 34, the concave portion 44, and the guide surface 48A. Thereby, the door 50 is rotationally moved clockwise (in plan view) along a U-curved direction. Thus, the door 50 is guided by the guide wall 42 to move substantially rearwardly in such a manner as to rotate around the pin holder 24 and the reel 14, without moving out of the movement locus present along the U-curved shape of the guide walls 42. Upon insertion of the accommodating case 12 (recording tape cartridge 10) into the drive device to a predetermined depth, the opening 20 is fully opened, as shown in FIG. 11C.

In the state described above, after the recording tape cartridge 10 has been positioned in the drive device, the door 50 is regulated not to further pivot (movement substantially to the rearward). Subsequently, the pull-out means of the drive device moves into the accommodating case 12. Thereby, the pull-out means pulls out the leader pin 22 positioned and held on the pin holder 24 and transfers it to be set to a take-up reel (not shown). The take-up reel and the reel 14 are then rotationally driven in synchronization. Thereby, the magnetic tape T is taken up on the take-up reel and is sequentially transferred out from the accommodating case 12. During the transfer operation, information is read (played back) or written (recorded) by, for example, a read/write head disposed along a predetermined tape path.

When ejecting the recording tape cartridge 10 from the drive device after the magnetic tape T has been wound back on the reel 14, the positioned state is relieved. Then, the recording tape cartridge 10 moved to the opposite direction of the direction of the arrow A according to either the urging force of the coiled spring 56 or an injection mechanism (not shown). Subsequently, the door 50 is guided through the convex portions 51 along the guide walls 42. The outer peripheral surface of the door 50 is regulated by the sloped wall portion 34, the concave portion 44, and the guide surface 48A. Concurrently, the door 50 is rotationally moved in the closing direction of the opening 20 according to the urging force of the coiled spring 56. Subsequently, when the end portion of the door 50 has engaged in the concave portion 30A of the sloped wall portion 30, the opening 20 is fully closed, thereby returning to the initial state.

Since the opening 20 is formed by cutting off an insertion-side corner portion of the rectangular accommodating case 12, the opening face thereof faces the direction of the arrow A and the direction of the arrow B. Alternatively, the opening face is inclined with respect to the direction of the arrow A. Specifically, the pull-out means of the drive device can access the leader pin 22 from the front face side facing the direction of the arrow A. Hence, the pull-out means does not need to access the leader pin 22 from a portion (side of the arrow B) further outward than the peripheral walls (sidewalls) 16A and 18A on the side of the arrow B. Therefore, a path for pulling out the magnetic tape T can be set shortest in the drive device. In addition, the above obviates the needs of providing a drive mechanism in which pull-out means accesses the leader pin from the side of the arrow B of the accommodating case 12 via a roundabout route. This enables miniaturization and cost reduction to be implemented.

In addition, the door 50, which is U-formed arcuate, rotationally moves in such a manner as to rotate around the reel 14 and the pin holder 24 (leader pin 22) without moving out of the movement locus present along the U-curved shape of the door 50, and thereby opens or closes the opening 20. Accordingly, the door 50 does not move out of the outer-frame region of the accommodating case 12 when opening or closing the opening 20.

Because of the above, the accommodating space in the drive device for the recording tape cartridge 10 can be reduced. Thereby, the drive device can be miniaturized, and spacing in the drive device can be effectively used. In addition, the movement locus of the door 50 does not interfere with the pin holder 24 (leader pin 22), the reel 14, and the like in the accommodating case 12. Concurrently, the door 50 can be formed in a minimized space. Hence, spacing in the accommodating case 12 can be effectively used.

Further, the engagement protrusion 60 of the drive device may be fixedly disposed to simply move into the slit 40 to be engageable with the operation protrusion 52 of the door 50. Therefore, the relevant structures may also be simple. Further, since the door 50 opens or closes the opening 20 according to the urging force of the coiled spring 56, the drive device need not be provided with a mechanism for driving the door 50 to the closing direction of the opening 20. This enables the construction of the opening/closing means (opening/closing member) of the drive device to further be simplified.

As described above, in the recording tape cartridge 10 of the present embodiment, the opening 20 is formed to allow the length of the pull-out path for the magnetic tape T to be shortest. The door 50 is capable of opening or closing the opening 20 without interfering with the reel 14 and the leader pin 22. In addition, the present embodiment enables the simplification of the construction of the engagement protrusion 60 provided as the opening/closing member that operates the door 50 to open and close the opening 20.

In addition, as described above, the movement locus of the door 50 is either a substantially circumference or a curve. Therefore, the corner portion of the accommodating case 12 can be largely cut off to form the opening 20 larger. Specifically, suppose a planar shielding member is used to open and close the opening 20 inclined to the direction of the arrow A. In this case, when accommodating the shielding member within the outer-frame region of the accommodating case 12 in the opened state of the opening 20, the shielding member needs to be changed in posture according to linear movement and rotational movement in order to open and close the opening 20. Therefore, the operation region of the shielding member is large, and the opening 20 needs to be formed small (by cutting off a small portion of the corner portion of the accommodating case 12) to prevent the leader pin 22, the reel 14, and the like from interfering with the operation region of the shielding member. However, the recording tape cartridge 10 of the present embodiment includes the door 50 that opens or closes the opening 20 by pivoting without moving out of the predetermined circumference, as described above. Therefore, the opening 20 can be enlarged.

In particular, the center of the pivot of the door 50, which opens or closes the opening 20 of which the opening face is inclined to the direction of the arrow A, can be determined independently of the axial center position of the reel 14. This enables arbitrary determinations for, for example, the inclination angle of the opening face of the opening 20 to the direction of the arrow A and the size of the opening 20 (distance between the front and rear ends). Thereby, the door 50 for opening or closing the opening 20 having arbitrary dimensions and shape corresponding to requirements of the drive device and the like can be obtained. That is, the degree of freedom in design of the opening 20 (recording tape cartridge 10) can be increased according to the construction including the door 50 described above.

In addition, as described above, in the construction in which the path for pulling out the magnetic tape T, also the path along which the magnetic tape T is passed is inevitably shortened. Therefore, wear that can be caused by contact between the magnetic tape T and a tape guide such as a rotatably-held roller can be reduced. Further, the opening 20 is formed by cutting off the corner portion of the accommodating case 12 and is formed to face the directions of the arrows A and B. With this shape, since a directional range of access to the leader pin 22 of the pull-out means such as a hook is widened, the range of settable positions for the leader pin 22 in the accommodating case 12 is also increased. Further, as described above, since the movement locus of the door 50 does not interfere a practically mountable position of the leader pin 22, the degree of freedom in design for a drive device is increased.

Further, since the door 50 is formed independently of the leader pin 22 that is pulled out from the accommodating case 12, the door 50 is not removable from the accommodating case 12 in the assembled state. Therefore, the door 50 is not removed because of, for example, impact imposed when the recording tape cartridge 10 has dropped. Since the leader pin 22 is hermetically accommodated in the accommodating case 12 with the opening 20 being blocked by the door 50 when the magnetic tape T is not used, the leader pin 22 does not easily allow, for example, to be damaged and stained. Hence, the leader pin 22 does not influence the pull-out operation for the magnetic tape T and the running thereof in the drive device, and does not damage the magnetic tape T.

Further, the convex portions 51, each of which is substantially elliptic (in plan view), slide in the state where they supported between the guide surfaces of the guide walls 42 aligned in the inner surfaces of the accommodating case 12 slidably move, and the door 50 thereby opens or closes the opening 20. Therefore, the grooves or the like provided in the inner surfaces of the accommodating case 12 as in the conventional case need not be provided. Consequently, the stiffness of the accommodating case 12 is not reduced. Further, since the convex portions 51 are each formed substantially elliptic in plan view, even when a force is imposed thereon from a direction other than the opening/closing direction of the door 50, there is no concern that the convex portion 51 will be broken thereby.

Further, the door 50 including the convex portions 51 is formed to have the height such that the rear side from the portion where the opening 20 is closed is slightly lower than the portion where the opening 20 is closed. Specifically, except for the difference in the plate width of the door 50, the rearside convex portions 51 are each formed slightly lower than the foremost convex portion 51. Thereby, the contact area of each of the convex portions 51 with respect to the guide walls 42 can be reduced. Consequently, the sliding resistance (friction) with respect to the guide wall 42 can even more be reduced.

Furthermore, the upper and lower surfaces of the convex portion 51 are each formed substantially arcuate in cross-sectional view (side view). In addition, the small protrusion 51A having the tip formed substantially arcuate or substantially triangular in plan view are formed on each sidewall of the convex portion 51. Therefore, since the portion linearly contacts, for example, the inner surface of the accommodating case 12 and the guide surface of the guide wall 42. Hence, although the convex portions 51 are each formed substantially elliptical in plan view, the contact area thereof can be reduced. Consequently, the door 50 can suitably be slid, and the opening 20 can smoothly be opened and closed.

According to the invention, the opening is provided by cutting off the corner portion on the side of insertion of the accommodating case into the drive device. Thereby, since an opening face of opening faces the direction of insertion of the accommodating case into the drive device, pull-out means on the side of the drive device can moves into the accommodating case from a front side thereof. The recording tape runs along the shortest path. Therefore, this obviates the needs of providing the drive device with a complicated mechanism causing the recording tape to run along a roundabout path, thereby enabling the design of a drive device that is compact and that can be manufactured at low costs.

Further, the shielding member slidably moves by being guided by the guide wall portion provided parallel to the inner surface of the accommodating case. Therefore, a groove or the like as provided in the conventional case need not be provided, thereby enabling a sufficient strength of the accommodating case to be secured. Additionally, the friction-reducing device that abuts the guide surface of the guide wall portion and that reduces friction between the shielding member and the guide surface is provided to protrude in the shielding member. Thereby, the shielding member can be suitably slid to open and close the opening.

The portion of the shielding member other than the opening-blocking portion thereof including the friction-reducing device is formed lower in height than the opening-blocking portion including the friction-reducing device. Thereby, the contact area between the friction-reducing device and the guide wall portion can be reduced. Consequently, sliding resistance (friction) therebetween can even more be reduced.

What is claimed is:

1. A recording tape cartridge comprising:
a substantially rectangular accommodating case for rotatably accommodating a single reel on which a recording tape is wound, the accommodating case having an opening which is formed by cutting off a corner portion of the accommodating case on a side thereof that is inserted into a drive device, and which is used to pull out a leader member attached to an end portion of the recording tape;
a shielding member that slidably moves to open and close the opening;
a guide wall portion which is provided parallel to an inner surface of the accommodating case and which guides the movement of the shielding member; and
a friction-reducing device which is provided so as to protrude from the shielding member, which abuts a guide surface of the guide wall portion, and which reduces friction between the shielding member and the guide surface,
wherein the shielding member slidably moves in an arc-shaped locus, and
wherein a portion of the shielding member other than an opening-blocking portion thereof is formed lower in height than the opening-blocking portion.

2. The recording tape cartridge according to claim 1, wherein the friction-reducing device is a convex portion, and the convex portion is elliptical shaped, as viewed in plan view, along a length direction of the shielding member.

3. The recording tape cartridge according to claim 2, wherein the accommodating case comprises an upper case and a lower case, the shielding member comprises an upper surface facing the upper case and a lower surface facing the lower case, a plurality of the convex portions are provided, and at least one of the plurality of convex portions are protrudingly provided symmetrically at the upper surface and the lower surface.

4. The recording tape cartridge according to claim 2, wherein a height of the convex portion is substantially equal to a height of the guide wall portion.

5. The recording tape cartridge according to claim 2, wherein a cross section of the convex portion has a shape including a circular arc, the convex portion includes two side portions opposing each other, and each of the side portions has a protrusion.

6. The recording tape cartridge according to claim 2, wherein a cross section of the convex portion has a triangular shape, the convex portion includes two side portions opposing each other, and each of the side portions includes a protrusion.

7. The recording tape cartridge according to claim 3, wherein a rear lower portion of the shielding member is diagonally cut off, and a convex portion disposed at the cut off portion of the rear lower portion is provided asymmetrically with respect to a convex portion disposed on a rear upper surface of the shielding member.

8. The recording tape cartridge according to claim 3, wherein the plurality of convex portions are provided such that five convex portions are provided on each of the upper surface and the lower surface, and four pairs thereof are vertically symmetric with respect to the shielding member.

9. The recording tape cartridge according to claim 3, wherein the convex portions located farther from the opening have lower heights.

10. The recording tape cartridge according to claim 5, wherein the protrusion has a semispherical shape.

11. The recording tape cartridge according to claim 6, wherein the protrusion has a semispherical shape.

12. The recording tape cartridge according to claim 9, wherein a height of each convex portion is lower by a predetermined difference than a height of an adjacent convex portion located closer to the opening.

13. The recording tape cartridge according to claim 12, wherein the predetermined difference between the heights of adjacent convex portions is equal to a thickness of the shielding member.

14. A recording tape cartridge comprising:
a rectangular accommodating case for rotatably accommodating a single reel on which a recording tape is wound, the accommodating case having an opening which is formed by cutting off a corner portion of the accommodating case on a side thereof in a direction in which the accommodating case is inserted into a drive device, and which is used to pull out a leader member attached to an end portion of the recording tape;
a shielding member that slidably moves to open and close the opening; and a guide wall portion which is provided parallel to an inner surface of the accommodating case and which guides the movement of the shielding member, wherein a portion of the shielding member other than an opening-blocking portion thereof is formed lower in height than the opening-blocking portion.

15. The recording tape cartridge according to claim 14, further comprising a friction-reducing device which is provided so as to protrude from the shielding member, which abuts a guide surface of the guide wall portion, and which reduces friction between the shielding member and the guide surface, wherein the faction-reducing device is a convex portion, and the convex portion is elliptical shaped, as viewed in plan view, along a length direction of the shielding member.

16. The recording tape cartridge according to claim 15, wherein the accommodating case comprises an upper case and a lower case, the shielding member comprises an upper surface facing the upper case and a lower surface facing the lower case, a plurality of the convex portions are provided, and at least one of the plurality of convex portions are protrudingly provided symmetrically at the upper surface and the lower surface.

17. The recording tape cartridge according to claim 15, wherein a height of the convex portion is substantially equal to a height of the guide wall portion.

18. The recording tape cartridge according to claim 15, wherein a cross section of the convex portion has a shape including a circular arc, the convex portion includes two side portions opposing each other, and each of the side portions has a protrusion.

19. The recording tape cartridge according to claim 15, wherein a cross section of the convex portion has a triangular shape, the convex portion includes two side portions opposing each other, and each of the side portions includes a protrusion.

20. The recording tape cartridge according to claim 16, wherein a rear lower portion of the shielding member is diagonally cut off, and a convex portion disposed at the cut off portion of the rear lower portion is provided asymmetrically with respect to a convex portion disposed on a rear upper surface of the shielding member.

21. The recording tape cartridge according to claim 16, wherein the plurality of convex portions are provided such that five convex portions are provided on each of the upper surface and the lower surface, and four pairs thereof are vertically symmetric with respect to the shielding member.

22. The recording tape cartridge according to claim 14, wherein the convex portions located farther from the opening have lower heights.

23. The recording tape cartridge according to claim 18, wherein the protrusion has a semi spherical shape.

24. The recording tape cartridge according to claim 19, wherein the protrusion has a semispherical shape.

25. The recording tape cartridge according to claim 22, wherein a height of each convex portion is lower by a predetermined difference than a height of an adjacent convex portion located closer to the opening.

26. The recording tape cartridge according to claim 25, wherein the predetermined difference between the heights of adjacent convex portions is equal to a thickness of the shielding member.

27. A recording tape cartridge comprising:

a rectangular accommodating case for rotatably accommodating a single reel on which a recording tape is wound, the accommodating case having an opening which is formed by cutting off a corner portion of the accommodating case on a side thereof that is inserted into a drive device, and which is used to pull out a leader member attached to an end portion of the recording tape;

a shielding member that slidably moves to open and close the opening;

a guide wall portion which is provided parallel to an inner surface of the accommodating case and which guides the movement of the shielding member; and a friction-reducing device which is provided so as to protrude from the shielding member, which abuts a guide surface of the guide wall portions and which reduces friction between the shielding member and the guide surface, wherein a portion of the shielding member other than an opening-blocking portion thereof which includes the faction-reducing device is formed lower in height than the opening-blocking portion which includes the friction-reducing device.

28. The recording tape cartridge according to claim 27, wherein the friction-reducing device is a convex portion, and the convex portion is elliptical shaped, as viewed in plan view, along a length direction of the shielding member.

29. The recording tape cartridge according to claim 28, wherein the accommodating case comprises an upper case and a lower case, the shielding member comprises an upper surface facing the upper case and a lower surface facing the lower case, a plurality of the convex portions are provided, and at least one of the plurality of convex portions are protrudingly provided symmetrically at the upper surface and the lower surface.

30. The recording tape cartridge according to claim 28, wherein a height of the convex portion is substantially equal to a height of the guide wall portion.

31. The recording tape cartridge according to claim 28, wherein a cross section of the convex portion has a shape including a circular arc, the convex portion includes two side portions opposing each other, and each of the side portions has a protrusion.

32. The recording tape cartridge according to claim 28, wherein a cross section of the convex portion has a triangular shape, the convex portion includes two side portions opposing each other, and each of the side portions includes a protrusion.

33. The recording tape cartridge according to claim 29, wherein a rear lower portion of the shielding member is diagonally cut off, and a convex portion disposed at the cut off portion of the rear lower portion is provided asymmetrically with respect to a convex portion disposed on a rear upper surface of the shielding member.

34. The recording tape cartridge according to claim 29, wherein the plurality of convex portions are provided such that five convex portions are provided on each of the upper surface and the lower surface, and four pairs thereof are vertically symmetric with respect to the shielding member.

35. The recording tape cartridge according to claim 29, wherein a height of each convex portion is lower by a predetermined difference than a height of an adjacent convex portion located closer to the opening.

36. The recording tape cartridge according to claim 31, wherein the protrusion has a semispherical shape.

37. The recording tape cartridge according to claim 32, wherein the protrusion has a semispherical shape.

38. The recording tape cartridge according to claim 35, wherein the predetermined difference between the heights of adjacent convex portions is equal to a thickness of the shielding member.

* * * * *